United States Patent
Sani et al.

(10) Patent No.: US 9,714,755 B2
(45) Date of Patent: Jul. 25, 2017

(54) ILLUMINATION DEVICE FOR HAND-HELD-SCANNER BODY

(71) Applicant: Datalogic IP Tech S.r.l., Bologna (IT)

(72) Inventors: Andrea Sani, Ferrara (IT); Riccardo Rosso, Ozzano Dell'Emilia (IT); Paolo Zanon, Modena (IT)

(73) Assignee: Datalogic ADC, Inc., Eugene, OR (US)

( * ) Notice: Subject to any disclaimer, the term of this patent is extended or adjusted under 35 U.S.C. 154(b) by 92 days.

(21) Appl. No.: 14/887,742

(22) Filed: Oct. 20, 2015

(65) Prior Publication Data

US 2016/0109095 A1 Apr. 21, 2016

Related U.S. Application Data

(60) Provisional application No. 62/065,995, filed on Oct. 20, 2014.

(51) Int. Cl.
- *F21V 7/00* (2006.01)
- *F21V 3/04* (2006.01)
- *G06K 7/10* (2006.01)
- *F21W 111/10* (2006.01)
- *F21W 131/40* (2006.01)

(52) U.S. Cl.
CPC .......... *F21V 7/0025* (2013.01); *F21V 3/0409* (2013.01); *F21V 3/0445* (2013.01); *G06K 7/10881* (2013.01); *F21W 2111/10* (2013.01); *F21W 2131/40* (2013.01)

(58) Field of Classification Search
CPC . G06K 7/10881; F21V 7/0025; F21V 3/0409; F21W 2111/10; F21W 2131/40
See application file for complete search history.

(56) References Cited

U.S. PATENT DOCUMENTS 5,214,270 A * 5/1993 Rando ............... G06K 7/10871
  235/462.36
6,238,076 B1   5/2001 Pascale et al.
(Continued)

FOREIGN PATENT DOCUMENTS

EP    755018 A2   12/2003
EP   1816585 A1    8/2007
(Continued)

OTHER PUBLICATIONS

European Search Report dated Mar. 29, 2016 in European Patent Application No. 15190626.0, 8 pages.
(Continued)

*Primary Examiner* — Mary Ellen Bowman
(74) *Attorney, Agent, or Firm* — Shook, Hardy & Bacon L.L.P.

(57) ABSTRACT

A device for illuminating a portion of a hand-held scanner to indicate a status of the scanner provides an even distribution of light emission. The device might include various elements that facilitate an even distribution of the light. For instance, in one aspect the device includes a set of reflective surfaces that are positioned throughout the scanner together with light-emitting devices (e.g., LED) in a manner to evenly transmit light emissions. In another aspect, the device includes a light-diffusing translucent member, which smoothly and evenly presents the light emissions that are reflected off of the reflective surfaces.

13 Claims, 5 Drawing Sheets

(56) References Cited

U.S. PATENT DOCUMENTS

| | | |
|---|---|---|
| 6,517,003 B2 | 2/2003 | Vassura et al. |
| 6,609,813 B1 | 8/2003 | Showers et al. |
| 6,661,521 B1 | 12/2003 | Stern |
| 7,097,105 B2 | 8/2006 | Wilz, Sr. et al. |
| 2003/0001018 A1 | 1/2003 | Hussey et al. |
| 2007/0069024 A1* | 3/2007 | Barkan ............. G06K 7/10881 235/454 |

FOREIGN PATENT DOCUMENTS

| | | | |
|---|---|---|---|
| EP | 1942442 | A2 | 7/2008 |
| EP | 2264560 | A1 | 12/2010 |

OTHER PUBLICATIONS

"Heron HD3100", www.datalogic.com, Feb. 6, 2015 (Feb. 6, 2015), XP002755073, Retrieved from the Internet: URL:http://www.datalogic.com/tools/download.aspx?iddwnfile=14190 &path=%2fupload%2fmarketlit%2fdatasheets%2fDS-HERONHD3100-ENA4.pdf &name=Heron+HD3100+%7e+English+A4 [retrieved on Apr. 3, 2016].

Motorola DS4800 Series Bar Code Scanner, Publication Date: Oct. 8, 2014, available at: http://web.archive.org/web/20141008004608/https://portal.motorolasolutions.com/Support/US-EN/Mobile+Networks+RFID+and+BarCode+Scanners/Bar+Code+Scanning/General+Purpose+Scanners/DS4800_US-EN.

\* cited by examiner

ILLUMINATION DEVICE FOR HAND-HELD-SCANNER BODY

CROSS-REFERENCE TO RELATED APPLICATIONS

This application claims priority to U.S. Provisional Application No. 62/065,995, filed Oct. 20, 2014, entitled "Illumination Device For Hand-Held-Scanner Body," the entirety of which is incorporated by reference.

BACKGROUND

Hand-held scanners are used in a variety of contexts for reading information off of an article, such as a barcode or other identifier. Typically, a scanner is equipped to present one or more indications that notify a user of the status of the scanner (e.g., scanning, stand-by, searching, etc.). For example, a scanner might provide LED indicators, audible alarms, or tactile feedback.

SUMMARY

An aspect of the present invention is directed to a device for illuminating a portion of a hand-held scanner to indicate a status of the scanner. In a further aspect, the device provides an even distribution of light emission across the portion of the hand-held scanner that is illuminated. The device might include various elements that facilitate an even distribution of the light. For instance, in one aspect the device includes a set of reflective surfaces that are positioned throughout the scanner together with light-emitting devices (e.g., LED) in a manner to evenly transmit light emissions. In another aspect, the device includes a light-diffusing translucent member, which smoothly and evenly presents the light emissions that are reflected off of the reflective surfaces.

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different elements or combinations of elements similar to the ones described in this document, in conjunction with other present or future technologies. Terms should not be interpreted as implying any particular order among or between various steps herein disclosed unless and except when the order of individual steps is explicitly described.

Figure 1:
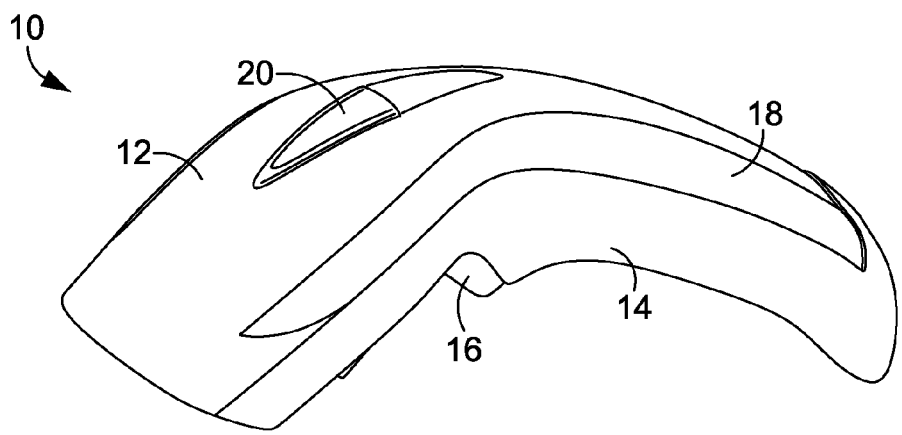
FIG. 1 depicts a hand-held scanner in accordance with an embodiment of the present invention.
Figure 2:
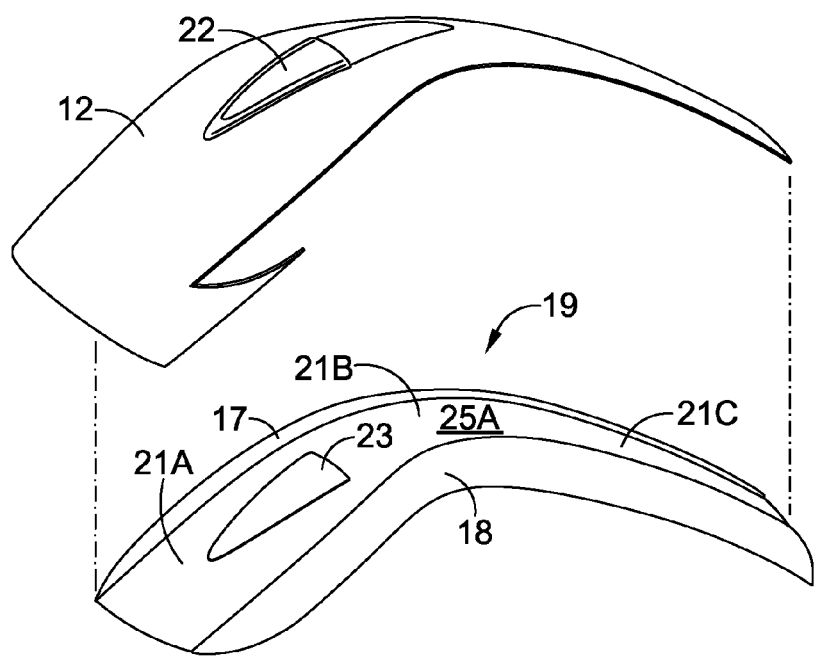
FIG. 2 depicts an exploded view of part of the scanner of FIG. 1 in accordance with an embodiment of the present invention.

Referring now to FIGS. 1 and 2, an aspect of the present invention will now be described. FIG. 1 includes a hand-held scanner 10, which includes a top portion 12 of a scanner housing or shell and a bottom portion 14 of a scanner housing. The housing is designed to encase and protect scanner components that function to provide scanning operations. The scanner 10 includes a trigger 16 for activating certain scanner components enclosed within the scanner housing. In addition, the scanner 10 includes a luminous stripe 18 that is illuminated by light-emitting devices (e.g., LEDs) encased within the housing 12 and 14, in order to indicate a status of the scanner. The scanner 10 also includes an upper indicator 20 that is also illuminated together with the luminous stripe 18.

FIG. 2 illustrates a portion of the scanner 10 in an exploded view. That is, in FIG. 2, the luminous stripe 18 is depicted disassembled from the top portion 12 of the scanner housing. As such, FIG. 2 depicts an aspect in which the luminous stripe 18 includes a side of an underskin 19, which fits together with the upper portion 12. The underskin might be constructed of various types of materials that can evenly and uniformly diffuse light. For example, the underskin 19 might include a rigid plastic member, such that the top portion 12 and the underskin 19 are two separate pieces. Or, the underskin 19 might include a soft rubber member, in which case the underskin 19 might be co-molded with the top portion 12. In addition, the top portion 12 includes a window 22 that aligns with the upper indicator portion 23 of the underskin 19.

Figure 6:
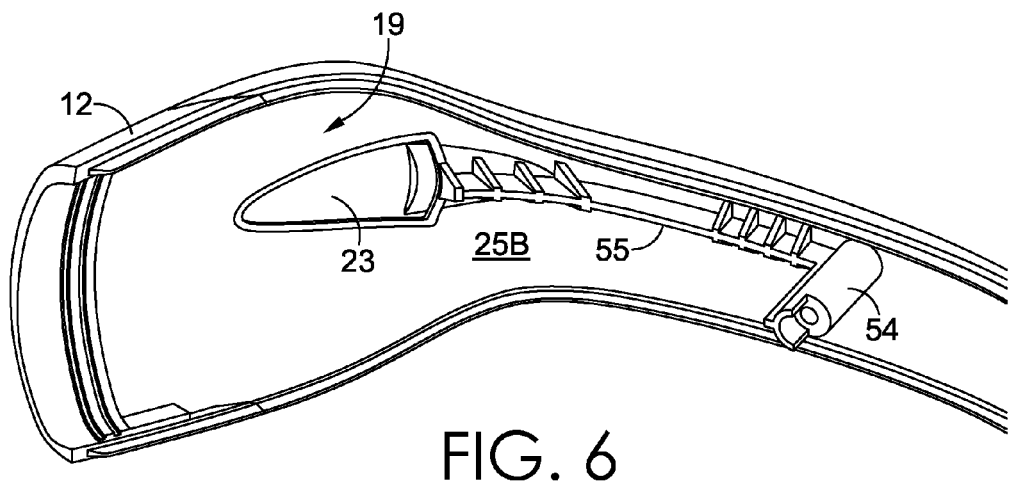
FIG. 6 depicts a top shell of a hand-held scanner in accordance with an embodiment of the present invention.

Further describing FIG. 2, the underskin 19 includes a central portion 21a-c having a head portion 21a and a handle portion 21c. The head portion 21a is positionable in a scanner head and includes the upper indicator portion 23, and the handle portion 21c is positionable in a scanner handle. In addition, a first side luminous stripe 18 extends along and terminates a first side of the handle portion 21c, and a second side luminous stripe 17 extends along and terminates a second side of the handle portion. The underskin 19 also includes a top surface 25a and a bottom surface 25b (FIG. 6). The central portion of the underskin 19 includes a curved portion 21b at an interface between the head portion 21a and the handle portion 21c, such that the underskin 19 generally curves away from the bottom surface 25b and curves towards the top surface 25a. In one aspect, this curved profile of the underskin 19 at least partially complements and fits into a space at between the housings 12 and 14.

Figure 3:
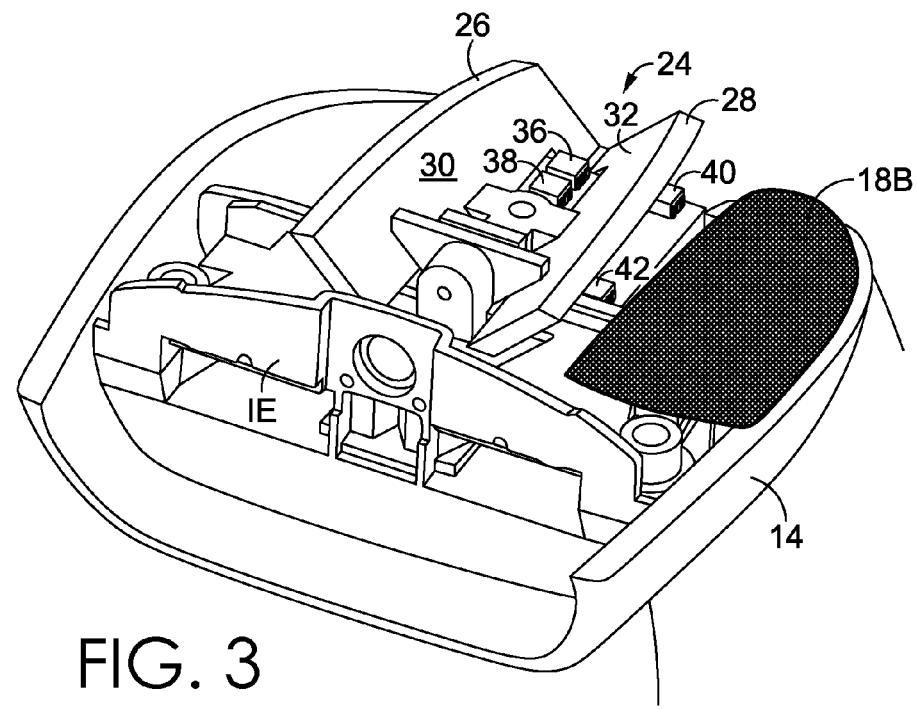
FIG. 3 depicts an illuminating device in a head portion of a hand-held scanner in accordance with an embodiment of the present invention.

An aspect of the present invention is directed to uniformly illuminating the stripe 18 and the upper indicator 20. Referring to FIG. 3, an illustration of some components of the scanner are depicted that might be housed in the head portion of the scanner 10. For example, an imaging engine IE might be housed in the head portion of the scanner. The imaging engine IE can be an imager module forming an image of the barcode, such engine including a linear imager sensor or an area sensor. A laser scanning engine that is capable of reading barcodes by sweeping a laser beam on them might also be housed in the head portion. These are merely examples of handheld-scanning devices, and various kinds of handheld scanners, including a RFID or EAS reader, could be used in combination with the subject matter described herein.

In addition, FIG. 3 depicts some other elements that contribute to substantially uniform illumination of the scanner-indicator portions 18 and 20. For reference, a portion 18B of the luminous stripe 18 is depicted, the portion 18B representing part of a peripheral boundary.

Figure 4:
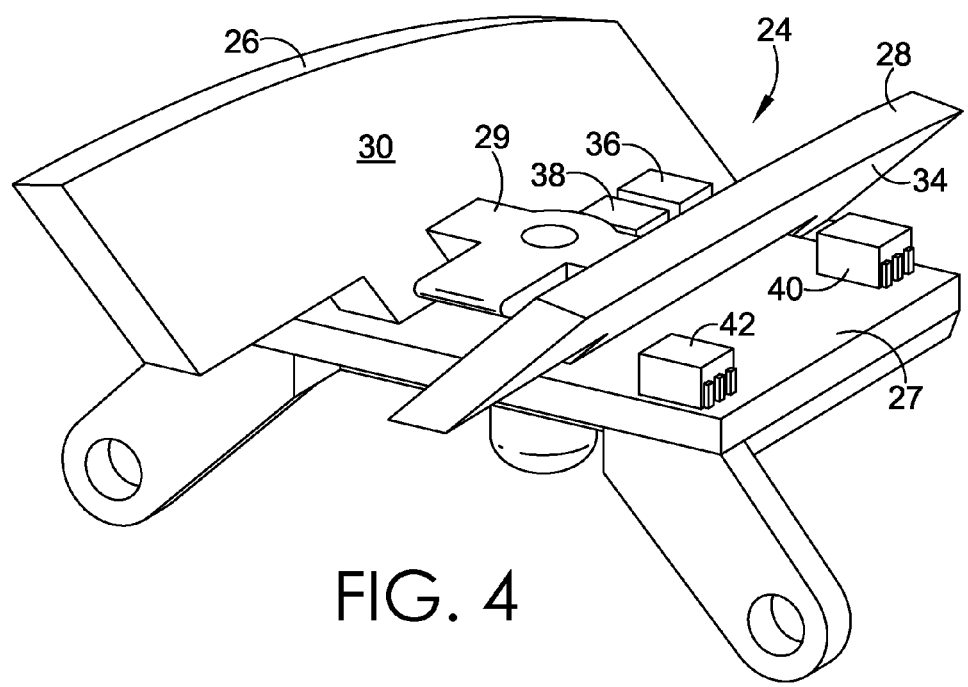
FIG. 4 depicts the illuminating device of FIG. 3 from a different perspective, in accordance with an embodiment of the present invention.

In an aspect of the invention, the head portion of the scanner houses a light-reflecting structure 24, which is also depicted in FIG. 4. The light-reflecting structure 24 includes a base portion 27 and a first wing 26 and a second wing 28 that extend from the base portion 27. The base portion 27 functions as a platform for various features of the light-reflecting structure 24, such as the wings 26 and 28; various light-emitting devices (e.g., LEDs) 36, 38, 40, and 42; and a holding post 29 for receiving a hardware fastener to secure the light-reflecting structure 24 inside the head of the scanner. Although not viewable in FIGS. 3 and 4, additional light-emitting devices are positioned on the base portion 27 in a manner similar to lights 40 and 42, but on the other side of the wing 26 that is not viewable from the perspective depicted in FIGS. 3 and 4. For example, see lights 41 and 43 in FIG. 7.

Figure 7:
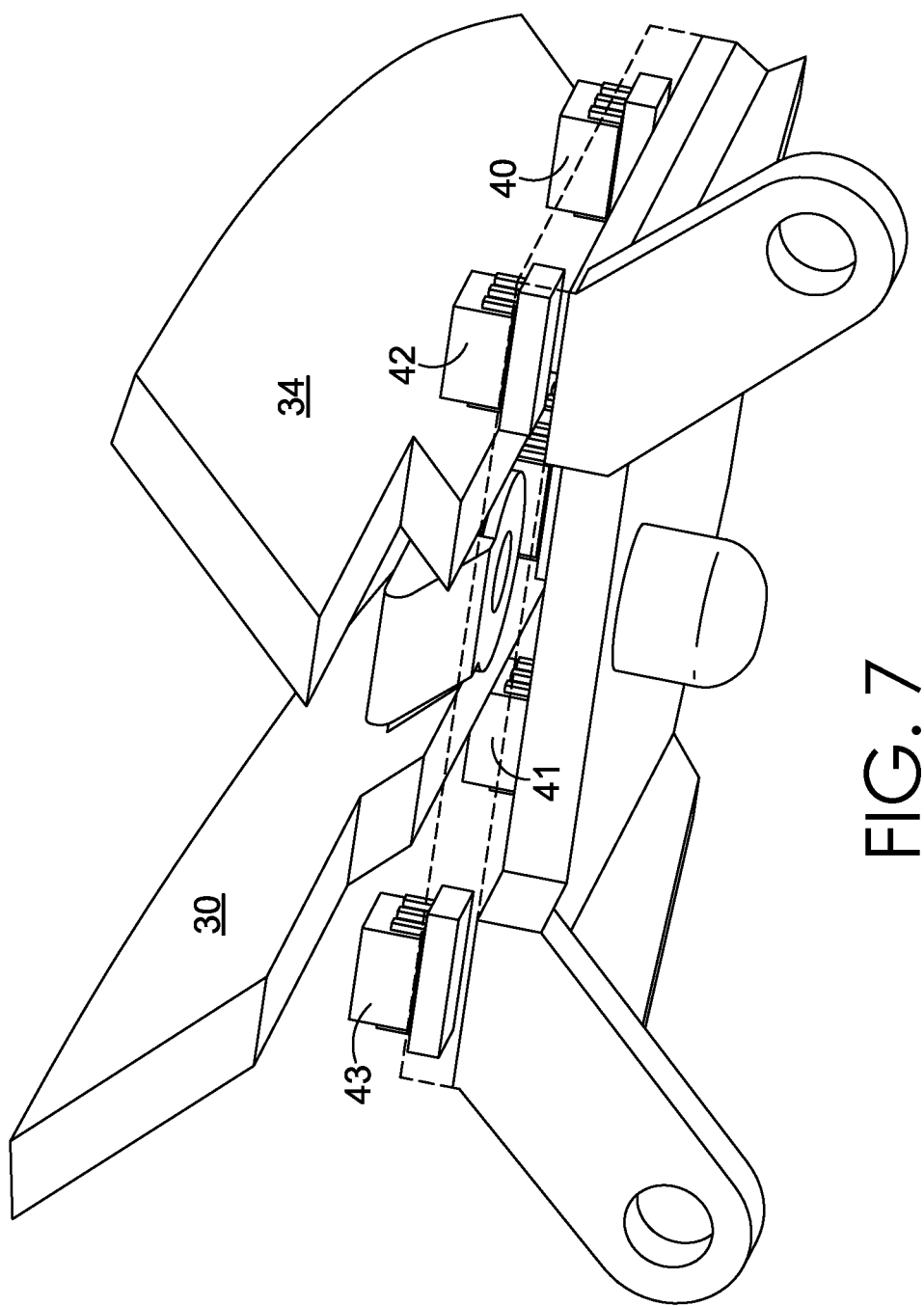
FIG. 7 depicts the illuminating device of FIGS. 3 and 4 from a different perspective, in accordance with an embodiment of the present invention.

The light-reflecting structure 24 is coated with a reflective coating or with a diffuse white paint in order to collect and diffuse light emitted from the light-emitting devices 36, 38, 40, 41, 42, and 43 (see also FIG. 7). For example, surfaces 30 and 32 of wings 26 and 28 face towards lights 36 and 38 and collect and diffuse light toward the upper indicator 23 of the underskin 19. The upper indicator portion 23 may substantially uniformly illuminate the upper indicator 20. In a similar manner, surface 34 faces toward lights 40 and 42 to collect and diffuse light toward at least a portion the luminous stripe 18 positioned in or near the head of the scanner. In another aspect, the portion facing the light-emitting devices (e.g., 36 and 38) might be made of a white-colored plastic that collects and diffuses light.

Figure 5:
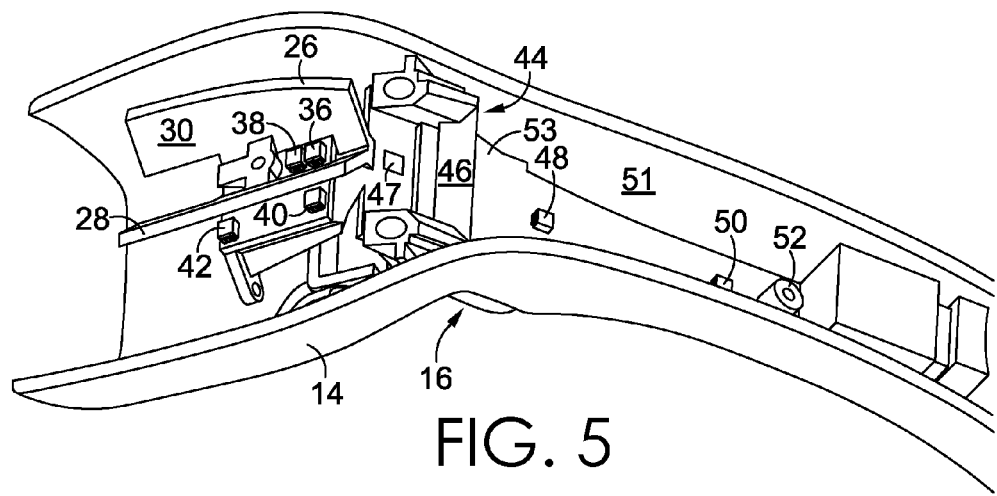
FIG. 5 depicts a part of a hand-held scanner with a top shell removed in accordance with an embodiment of the present invention.

Referring now to FIG. 5, a handle portion of the scanner is depicted together with at least part of the head portion described above. FIG. 5 includes a printed circuit board (PCB) 53, which is held in place by a PCB holder 44. In addition, light-emitting devices 47, 48, and 50 are positioned throughout the handle portion in order to uniformly light the length of the luminous stripe 18. The handle portion of the scanner is substantially hollow and devoid of structural elements that would hinder or shadow the light emitted from the devices 47, 48, and 50.

In a further aspect, the surface 46 (of PCB holder 44) and internal lateral walls 51 are coated with a white diffusing paint or reflective coating, similar to the wings 26 and 28. In addition, fastener post 52 might also be coated. In an alternative aspect, the lower portion 14, which includes internal surface 51 and post 52, is molded in white plastic. As such, the walls 51 and other portions of the handle collect and diffuse light emitted from lights 47, 48, and 50 substantially uniformly along the luminous stripe 18.

Referring now to FIG. 6, an underneath side of the underskin 19 is depicted that is oriented toward the lights 36, 38, 40, 42, 47, 48, and 50 depicted in FIG. 5 (and lights 41 and 43 depicted in FIG. 7) and that includes a post 54 for aligning with the post 52. The posts 52 and 54 can receive a fastener for attaching the underskin 19 to the shell portion(s) of the scanner. In one aspect, the underskin 19 is constructed of a diffuse material to uniformly distribute light emitted from the lights. In addition, the structures constructed into the underskin 19, such as the post 54 and the strengthening ribs 55 are also made from a diffusive material in order to reduce obstructions of the lights and possible shadows.

Figure 8:
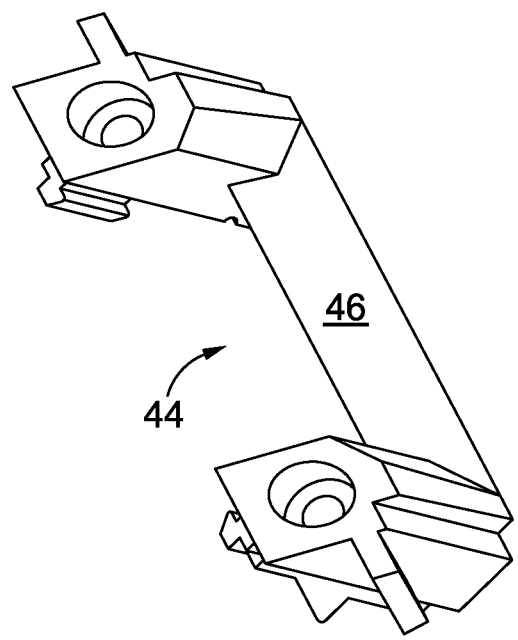
FIG. 8 depicts a printed circuit board (PCB) securing device, in accordance with an embodiment of the present invention.
Figure 9:
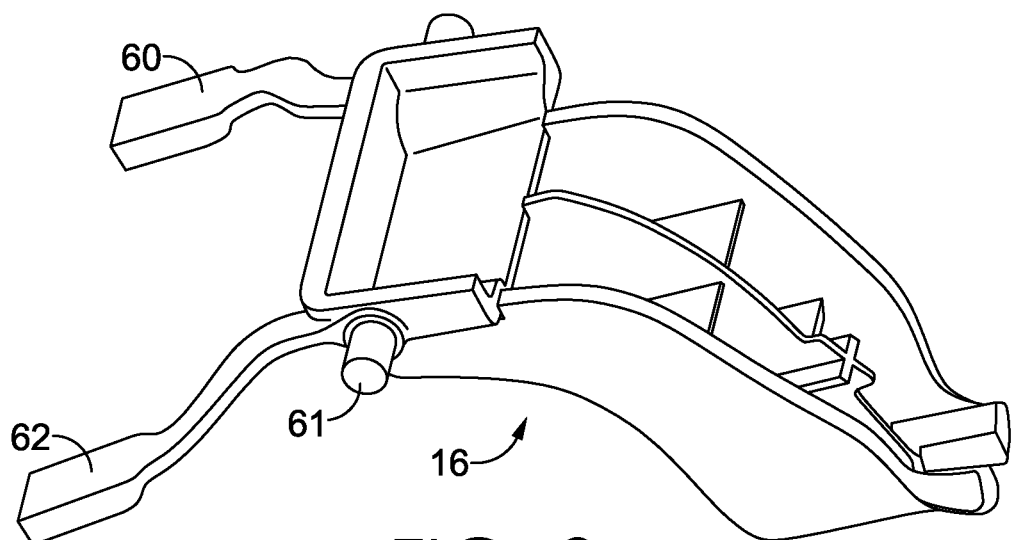
FIG. 9 depicts a trigger of a hand-held scanner, in accordance with an embodiment of the present invention.

FIG. 7 depicts an underneath side view of the light-reflecting structure 24 and the lights 40-43 are viewable. FIG. 8 depicts the PCB holder 44 and surface 46, which functions to collect and diffuse light (e.g., from light 47).

In a further aspect, a scanner includes a trigger 16. Trigger 16 includes an axle 61 for pivoting when the trigger is engaged. In addition, the trigger 16 includes two legs 60 and 62 that engage a lower part of the scanner head housing. The legs 60 and 62 are particularly resistant to fatigue and provide good user feedback.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An illumination system for illuminating a body of a hand-held scanner, the illumination system comprising:
   a first reflecting plate that extends from a base and that includes one or more surfaces for reflecting light emitted from one or more light-emitting devices;
   a second reflecting plate that extends from the base and that includes one or more surfaces for reflecting light emitted from one or more light-emitting devices; and
   a first set of one or more light-emitting devices positioned between the first reflecting plate and the second reflecting plate.

2. The illumination system of claim 1 further comprising, a second set of one or more light-emitting devices positioned underneath the first reflecting plate and a third set of one or more light-emitting devices positioned underneath the second reflecting plate.

3. The illumination system of claim 1, wherein the one or more surfaces of the first and second reflecting plates include a reflecting coating.

4. The illumination system of claim 1 further comprising, a light-diffusing body that integrates with a shell of the hand-held scanner and that diffuses light reflected from the first and second reflecting plates.

5. A hand-held scanner comprising:
an upper housing member;
a lower housing member that attaches to the upper housing member to enclose a space, wherein the upper housing member and the lower housing member combine to at least partially form a scanner head and a scanner handle;
an underskin positioned in the space and between the upper housing member and the lower housing member, wherein the underskin includes a luminous stripe that extends along a length of the upper housing member and the lower housing member;
a first set of one or more light-emitting devices positioned in the scanner head;
a set of one or more reflective plates positioned in the scanner head to collect and diffuse light from the first set of one or more light-emitting devices, wherein light reflected off of the one or more reflective plates is diffused through the luminous stripe; and
a second set of one or more light-emitting devices positioned in the scanner handle, wherein the lower housing member includes a surface to collect and diffuse light from the second set of one or more light-emitting devices and to the luminous stripe.

6. The hand-held scanner of claim 5, wherein the upper housing member includes an upper-indicator window and wherein the underskin includes an upper-indicator portion that aligns with the upper-indicator window, the upper-indicator portion being substantially uniformly illuminated by the first set of one or more light-emitting devices reflecting off of the one or more reflective plates.

7. The hand-held scanner of claim 5, wherein the luminous stripe forms at least part of an external-facing side wall of the hand-held scanner.

8. An underskin for dispersing light in a hand-held scanner, the underskin comprising:
a central portion having a head portion positionable in a scanner head and a handle portion positionable in a scanner handle, the head portion including an upper-indicator portion;
a first side luminous stripe extending along and terminating a first side of the handle portion; and
a second side luminous stripe extending along and terminating a second side of the handle portion, wherein the central portion, the first side luminous stripe, and the second side luminous stripe are constructed of a diffuse material to diffuse light from the central portion to the first and second side luminous stripes.

9. The underskin of claim 8, wherein the underskin includes a top surface and a bottom surface, and wherein the upper-indicator portion is positioned on the top surface.

10. The underskin of claim 9, wherein the bottom surface includes one or more strengthening ribs that are also constructed of the diffuse material.

11. The underskin of claim 9, wherein the central portion includes a curved portion at an interface between the head portion and the handle portion, such that the underskin generally curves away from the bottom surface and curves towards the top surface.

12. The underskin of claim 8, wherein the diffuse material includes a plastic.

13. The underskin of claim 8, wherein the diffuse material includes a rubber.

* * * * *

UNITED STATES PATENT AND TRADEMARK OFFICE
CERTIFICATE OF CORRECTION

PATENT NO. : 9,714,755 B2
APPLICATION NO. : 14/887742
DATED : July 25, 2017
INVENTOR(S) : Andrea Sani, Riccardo Rosso and Paolo Zanon Page 1 of 1

It is certified that error appears in the above-identified patent and that said Letters Patent is hereby corrected as shown below:

On the Title Page

Column 1, Item (73): "Datalogic ADC, Inc., Eugene, OR (US)" should read --Datalogic IP Tech S.r.l., Bologna (IT)--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*